United States Patent [19]
Asai et al.

[11] Patent Number: 5,111,294
[45] Date of Patent: May 5, 1992

[54] MOTION COMPENSATED INTERFRAME ENCODING SYSTEM WITH ADAPTIVE QUANTIZATION

[75] Inventors: Kohtaro Asai; Tokumichi Murakami; Kazuhiro Matsuzaki, all of Kanagawa, Japan

[73] Assignee: Mitsubishi Denki Kabushiki Kaisha, Tokyo, Japan

[21] Appl. No.: 645,322

[22] Filed: Jan. 24, 1991

Related U.S. Application Data

[60] Continuation-in-part of Ser. No. 466,549, Jan. 17, 1990, abandoned, which is a division of Ser. No. 416,984, Oct. 4, 1989, Pat. No. 4,954,892.

[30] Foreign Application Priority Data

Feb. 14, 1989 [JP]  Japan .................................. 1-34344
Feb. 14, 1989 [JP]  Japan .................................. 1-34345

[51] Int. Cl.$^5$ .................................. H04N 7/13
[52] U.S. Cl. .................................. 358/136; 358/105
[58] Field of Search .................................. 358/136, 135, 105

[56] References Cited

U.S. PATENT DOCUMENTS

| | | | |
|---|---|---|---|
| 4,077,053 | 2/1978 | Ishiguro | 358/136 |
| 4,580,162 | 4/1986 | Mori . | |
| 4,706,265 | 11/1987 | Furukawa . | |
| 4,723,161 | 2/1988 | Koga | 358/136 |
| 4,734,767 | 3/1988 | Kaneko et al. . | |
| 4,851,906 | 7/1989 | Koga et al. | 358/136 X |
| 4,972,260 | 11/1990 | Fujiwaka et al. | 358/136 |
| 5,028,995 | 7/1991 | Izawa et al. | 358/136 X |

FOREIGN PATENT DOCUMENTS 0260721 3/1988 European Pat. Off. .
0262460 4/1988 European Pat. Off. .

OTHER PUBLICATIONS

Von Peter Vogel, "Videobild auf der Datenleitung", Funkschau, No. 26, 1988, Franzis-Verlag, Munich, pp. 60-63.
Von Bernard Hammer, "Transformationscodierung von Bildsequenzen mit der M-Hadamard-Transformation", Frequenz, No. 7/8, 1985, pp. 226-234.

*Primary Examiner*—Victor R. Kostak
*Attorney, Agent, or Firm*—Rothwell, Figg, Ernst & Kurz

[57] ABSTRACT

A picture signal encoding and decoding apparatus which transmits a digital picture signal by encoding, and receives and decodes an incoming encoded signal comprises a configuration in which a condition not to make a receiving buffer overflow can be controlled on the transmitting side, and a plurality of quantizers are prepared and a proper quantizing characteristic is selected and used according to the sequence of transformed coefficients and the size of a motion vector. Therefore, it is not necessary to prepare a receiving buffer of a large capacity or a high speed decoding circuit, so that the apparatus can be manufactured at a low cost and the stability of operation is improved and also a signal can be compressed efficiently owing to the realization of quantization corresponding to a statistical characteristic of an input signal.

4 Claims, 10 Drawing Sheets

| SEQUENCE OF A TRANSFORMED COEFFICIENT | SIZE OF A MOVEMENT VECTOR | QUANTIZING STEP SIZE |
|---|---|---|
| LOW BAND | SMALL | SMALL |
| | MEDIUM | SMALL |
| | LARGE | MEDIUM |
| MEDIUM BAND | SMALL | SMALL |
| | MEDIUM | MEDIUM |
| | LARGE | LARGE |
| HIGH BAND | SMALL | MEDIUM |
| | MEDIUM | LARGE |
| | LARGE | LARGE |

FIG. 9

| SEQUENCE OF A TRANSFORMED COEFFICIENT | SIZE OF A MOVEMENT VECTOR | QUANTIZING STEP SIZE |
|---|---|---|
| LOW BAND | SMALL | SMALL |
| | MEDIUM | SMALL |
| | LARGE | MEDIUM |
| MEDIUM BAND | SMALL | SMALL |
| | MEDIUM | MEDIUM |
| | LARGE | LARGE |
| HIGH BAND | SMALL | MEDIUM |
| | MEDIUM | LARGE |
| | LARGE | LARGE |

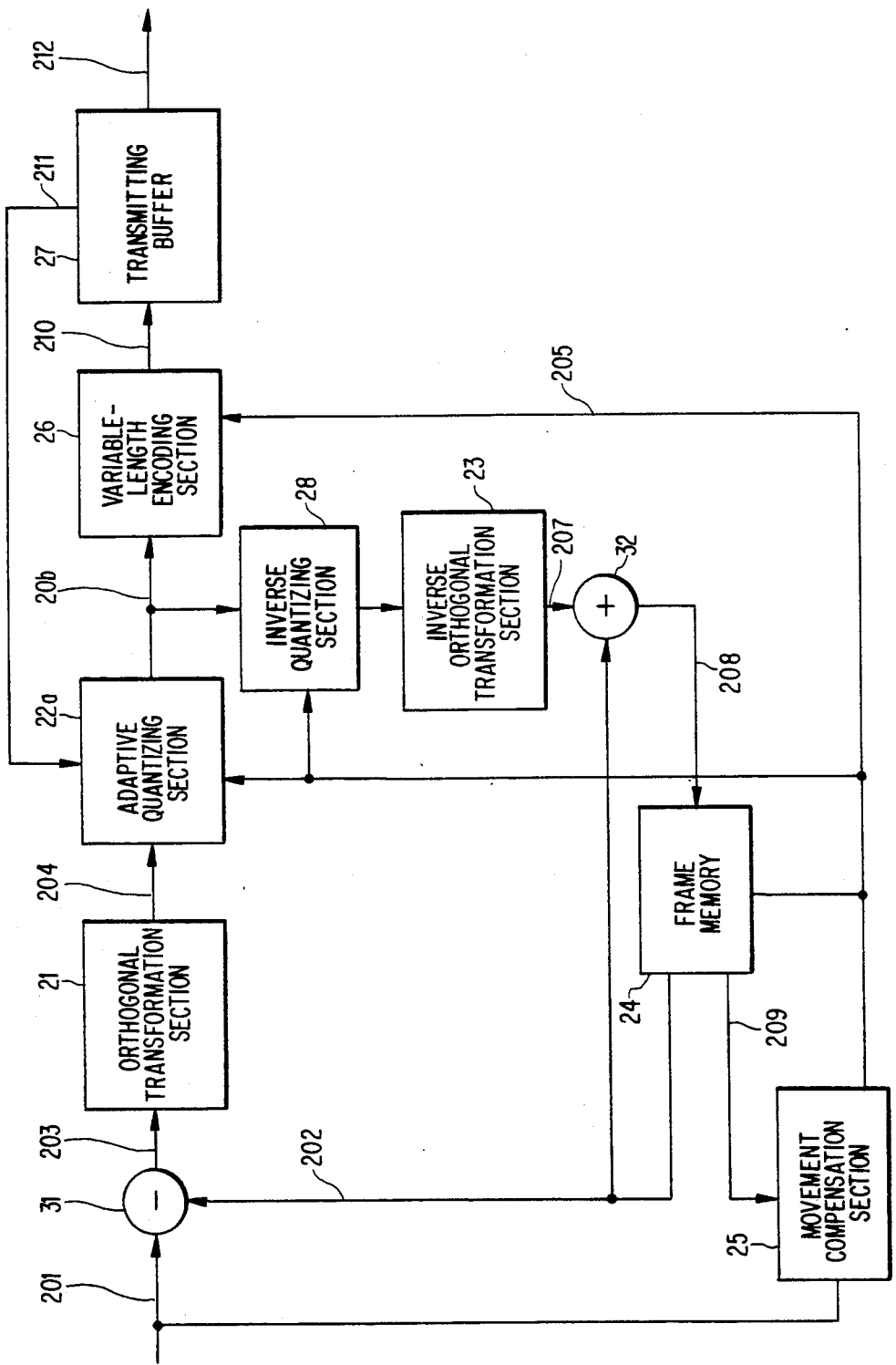

MOTION COMPENSATED INTERFRAME ENCODING SYSTEM WITH ADAPTIVE QUANTIZATION

This is a continuation-in-part of application Ser. No. 07/466,549, filed Jan. 17, 1990, now abandoned, which in turn is a division of application Ser. No. 07/416,984, filed Oct. 4, 1989, now U.S. Pat. No. 4,954,892.

BACKGROUND OF THE INVENTION

1. Field of the Invention

The present invention relates to a picture signal encoding and decoding apparatus which encodes a digital picture signal for transmission and decodes a received encoded signal.

2. Description of the Prior Art

FIG. 1 is a simplified block diagram of a configuration of a picture signal encoding and decoding apparatus of a conventional type, for example, as shown in "Interframe Encoding apparatus for video conferencing", a technical report IE84-4, 1984 of The Institute of Electronics and Communication Engineers of Japan. In the figure, 1 is an encoding section which encodes a digitized picture signal series; 2 is a variable-length-encoding section which variable-length-encodes code words encoded in the encoding section 1; 3 is a transmitting buffer which smooths out speed; 6 is a framing section; 7 is a deframing section; 8 is a receiving buffer; 9 is a variable-length-decoding section; 10 is a decoding section. 101 is a digitized picture signal series; 102 is a code-word series encoded in the encoding section 1; 103 is a code-word series variable-length-encoded in the variable-length encoding section; 108 is a feedback control signal; 109 is a code-word series whose speed is smoothed out by the transmitting buffer 3; 110 is a received code-word series; 111 is an output read from the receiving buffer 8; 112 is a code-word series converted to a fixed-length code-word series in the variable-length decoding section; 113 is a digital picture signal series decoded in the decoding section 10. FIG. 2 is an illustrative drawing showing the operation of the transmitting buffer 3. FIG. 3 is an illustrative drawing showing the operation of the receiving buffer 8.

The operation is explained in the following. The digitized picture signal series 101 is converted to a code-word series 102 in the encoding section 1. In this step, each code word has a fixed length. Next, the variable-length encoding is performed by utilizing the deviation of occurrence probability of each code word in the variable-length encoding section 2; thus the code-word series 102 is converted to a variable-length code-word series 103. In the result, the sum of the length of the variable-length code-word series 103 becomes smaller than a code quantity, the sum of the length of the code-word series 102, so that transmission efficiency can be improved. As the code quantity becomes variable, to send out these data to a channel at a constant transmission rate smoothing out of the speed is performed in the transmitting buffer. The output 109 of the transmitting buffer 3 has a constant rate (a code quantity in a unit time) corresponding to the transmission rate. The operation of the transmission buffer 3 is explained referring to FIG. 2. In FIG. 2(a), the axis of abscissa represents time and the axis of ordinate represents a buffer accumulation quantity. The series to be input to the transmitting buffer 3 are variable-length and the output has a constant rate; therefore the accumulation quantity varies as shown in FIG. 2(a). FIG. 2(b) is a buffer output corresponding to FIG. 2(a). The decrease in the buffer accumulation quantity means a state where data are read from the buffer more than the data are written to the buffer, and when the accumulation quantity becomes zero nothing is left to be read in the buffer so that a dummy signal is output. In contrast with this, when the writing to the buffer is more than the reading from the buffer accumulation quantity increases. As the buffer capacity is limited, if the buffer accumulation quantity is kept increasing, the buffer may overflow in time. To prevent the overflow, when the buffer accumulation quantity becomes large, the creation of code words is suppressed by controlling the operation of the encoding section 2 by using a feedback control signal 108. The output 109 read from the buffer has a constant rate. In a framing section 6 framing is performed at fixed intervals for the transmitting buffer output 109 and the data are output to a transmission line. On the receiving side deframing is performed for an input signal series in a deframing section 7, and the data are once stored in a receiving buffer 8. The output of the buffer 8 is a variable-length code series 111, and the series 111 is converted to the fixed-length code series 112 in the variable-length decoding section 9. The fixed-length code series 112 is decoded in the decoding section 10 and the digital picture signal series 113 is obtained. In the above-mentioned process of receiving and decoding of a signal, the decoding section 10 can only decode a certain section of a picture signal series (for example, a sequential picture signal series such as a picture signal frame or a line) at a fixed speed. Therefore, the speed of the fixed-length code series 112 cannot exceed the speed in which the decoding section 10 is capable of decoding. In the similar way, there is a speed limit in the operation of the variable-length decoding section 9. On the transmitting side, the transmitting buffer 3 located near the output port smooths out the speed of a signal; in correspondence to this, the receiving buffer 8 on the receiving side adjusts the speed. The operation of the receiving buffer 8 is explained in the following referring to FIG. 3. It is assumed that the input signal series 110 for the receiving buffer 8 is given as shown in FIG. 3(a). As the signal series is of a variable-length code-word series, when the series is separated, for example, into picture frames, the intervals are not uniform. T in FIG. 3(b) is a time interval in which the variable-length decoding section 9 and the decoding section 10 can process code words corresponding to the frame. When the quantity of the code words corresponding to a frame in FIG. 3(a) is smaller than the time interval in FIG. 3(b), the code words corresponding to the next frame sent in a time difference mentioned in the above are accumulated in the receiving buffer 8. If a condition under which data accumulates continues long, there is a risk that data may overflow the buffer memory, and the capacity of the receiving buffer is therefore designed to have some redundancy.

A picture signal encoding and decoding apparatus of a conventional type is constituted as described above; it is therefore necessary to control the operating speed of a variable-length decoding section and a decoding section as fast as possible. Because of this, there has been a problem that the size of the apparatus and the capacity of the receiving buffer have to be made large, which makes the delay time large.

The encoding of a signal in an encoding section of a picture signal encoding and decoding apparatus is, to be precise, performed by a transform coding method.

Transform coding is a process wherein a digital picture signal is transformed to a sequence corresponding to a spatial frequency by orthogonal transformation such as by a method in which a discrete cosine transform is used as shown, for example, in the following reference. W. H. Chen. "Scence Adaptive Coder". (IEEE. Transactions on Communications, Vol. COM 32, No. 3, March, 1984.) FIG. 4 is a block diagram showing the configuration of a transform coding apparatus as shown in Kato, et al., "A proposal for an encoding control method in MC - DCT encoding system" (No. 203 all-Japan meeting of information and system branch of The Institute of Electronics, Information and Communication Engineers of Japan, 1987.) In the figure, 31 is a subtracter which performs subtraction of an interframe predictive signal 202 for movement compensation from an input signal 201; 21 is an orthogonal transformation section which performs an orthogonal transformation for an interframe differential signal 203; 22b is a quantizing section which threshold-processes and quantizes a transformed coefficient 204 obtained by orthogonal transformation according to a buffer accumulation quantity 211; 23 is an inverse orthogonal transformation section which creates a decoded interframe differential signal 207 by performing inverse orthogonal transformation for a quantized output signal 206; 32 is an adder; 24 is a frame memory which creates the interframe predictive signal for movement compensation 202; 25 is a movement compensation section; 26 is a variable-length encoding section; 27 is a transmitting buffer.

The operation is explained in the following. A differential signal 203 from which a redundant component is removed is created by getting the difference between the digitized input signal 201 and the interframe predictive signal for movement compensation. In the orthogonal transformation section 21, the transformed coefficient 204 is created by transforming the interframe differential signal to a spatial frequency domain through orthogonal transformation. In the quantizing section 22b, the transformed coefficient Ci 204 undergoes threshold processes as mentioned below based on a buffer accumulation quantity to be described later.

Buffer accumulation quantity: large→threshold value Th: large, buffer accumulation quantity: small→threshold value Th: small, $Th < C_i \rightarrow C_i$: a significant coefficient, $Th \geq C_i \rightarrow C_i$: an insignificant coefficient.

In the case of a threshold process, a transformed coefficient 204 which is classified to be a significant coefficient is quantized in the quantizing section and is output as a quantized output signal 206. On the other hand, the transformed coefficient 204 which is classified to be an insignificant coefficient is output as a zero quantized output signal 206. The quantized output signal 206 is encoded into a variable-length signal together with a moving vector 205, which is explained later, in the variable-length encoding section 26 and is output as an encoded data 210; on the other hand the signal 206 is converted to a decoded interframe differential signal 207 in the inverse orthogonal transformation section 23. In the adder 32, the decoded interframe differential signal 207 is added to the interframe predictive signal for movement compensation 202 to create a decoded signal 208. The decoded signal 208 is stored temporarily in the frame memory 24, and in the case of movement compensation the interframe predictive signal for movement compensation 202 is output. In the movement compensation section 25, the movement quantity of the input signal 201 is detected by using a foreframe decoded signal 209 from the frame memory 24 to output a movement vector 205. The transmitting buffer 27 stores the encoded data 210 temporarily and outputs them as transmitting data 212 at a constant bit rate, and at the same time it outputs a buffer accumulation quantity 211 as a feedback signal to prevent buffer overflow.

The encoding section of a transform coding portion of a conventional picture signal encoding and decoding apparatus is constituted as described above, so that the adaptive quantization of a input signal according to its statistical characteristic is difficult, and it has thus been a problem to compress the signal effectively.

SUMMARY OF THE INVENTION

A first object of the present invention is to provide a picture signal encoding and decoding apparatus in which conditions are established on the transmitting side under which the reception of a signal and the decoding of the signal are possible on the receiving side.

A second object of the present invention is to provide a picture signal encoding and decoding apparatus in which the operation speed can be kept low, that is, the size of the configuration can be made small.

A third object of the present invention is to provide a picture signal encoding and decoding apparatus which has an encoding section by a transform coding method in which effective quantization according to the statistical characteristic of a signal to be encoded is possible.

To accomplish the purpose of the first and the second objects, the picture signal encoding and decoding apparatus according to the present invention is constituted as explained in the following. The apparatus monitors the timing at which a fixed section (for example, a picture signal frame or a line etc.) of a picture signal is encoded and transmitted to a transmission line, and compares the timing with a reference timing. If the transmitting timing is later the reference timing is reset when the transmission of the coded words corresponding to the fixed section is completed. If the transmitting timing is earlier the time difference shall be found and only when the time difference is larger than a predetermined threshold value, after the completion of transmission of coded words corresponding to the fixed section, dummy data are added to absorb the time difference.

The reference timing according to the present invention corresponds to a time interval necessary for decoding a fixed section of a picture signal on the receiving side, so as to prevent the transmission of data into a transmission line from being executed at an extremely shorter time interval than the reference timing. As a result, the insertion of proper dummy data can be executed if necessary.

To accomplish the third object, the picture signal encoding and decoding apparatus according to the present invention has a plurality of quantizing characteristics in the encoding section and adaptively selects a specified quantizing characteristic for a signal to be encoded according to the detected movement quantity and the sequence of a transformed coefficient.

A picture signal encoding and decoding apparatus according to the present invention selects a specified quantizing characteristic out of prepared plural number of quantizing characteristics according to the movement quantity of a signal to be encoded and the sequence of a transformed coefficient, and performs quantization of a transformed coefficient.

The above-mentioned objects and other objects and new features of the present invention will be understood clearly with reference to the following detailed description and accompanying drawings. The drawings are, however, solely for explanatory purpose, and do not limit the scope of the present invention.

BRIEF DESCRIPTION OF THE DRAWINGS

FIG. 9 is a drawing showing the relations among the sequence of transformed coefficients, the size of a movement vector and a quantizing characteristic to be used, in the case where three kinds of quantizing characteristics of different quantizing step sizes are prepared in another embodiment mentioned in the above.

FIG. 10 is a block diagram showing the configuration of a decoding section in a picture signal encoding and decoding apparatus in still another embodiment of the present invention.

DETAILED DESCRIPTION OF THE PREFERRED EMBODIMENTS

Figure 1:
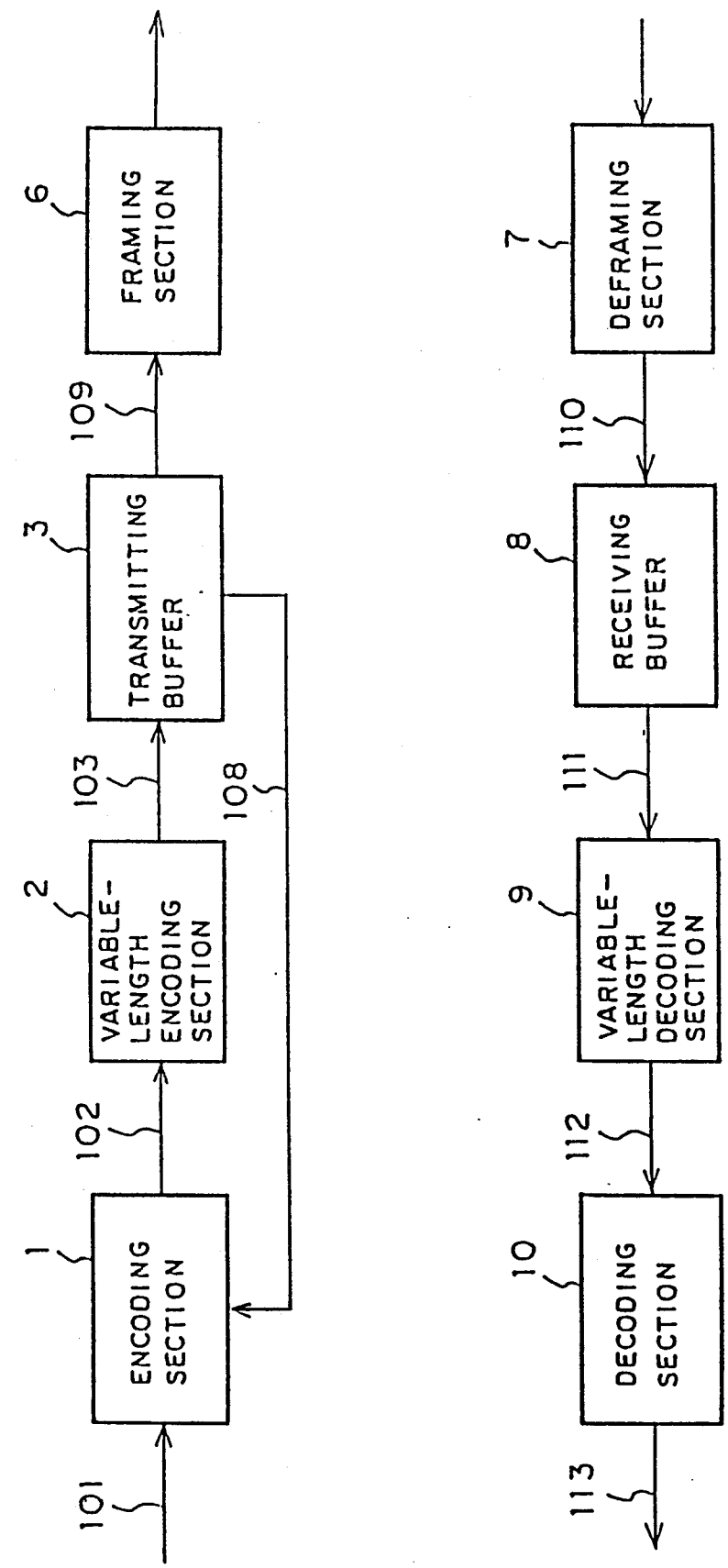
FIG. 1 is a block diagram showing the configuration of a conventional picture signal encoding and decoding apparatus.
Figure 2:
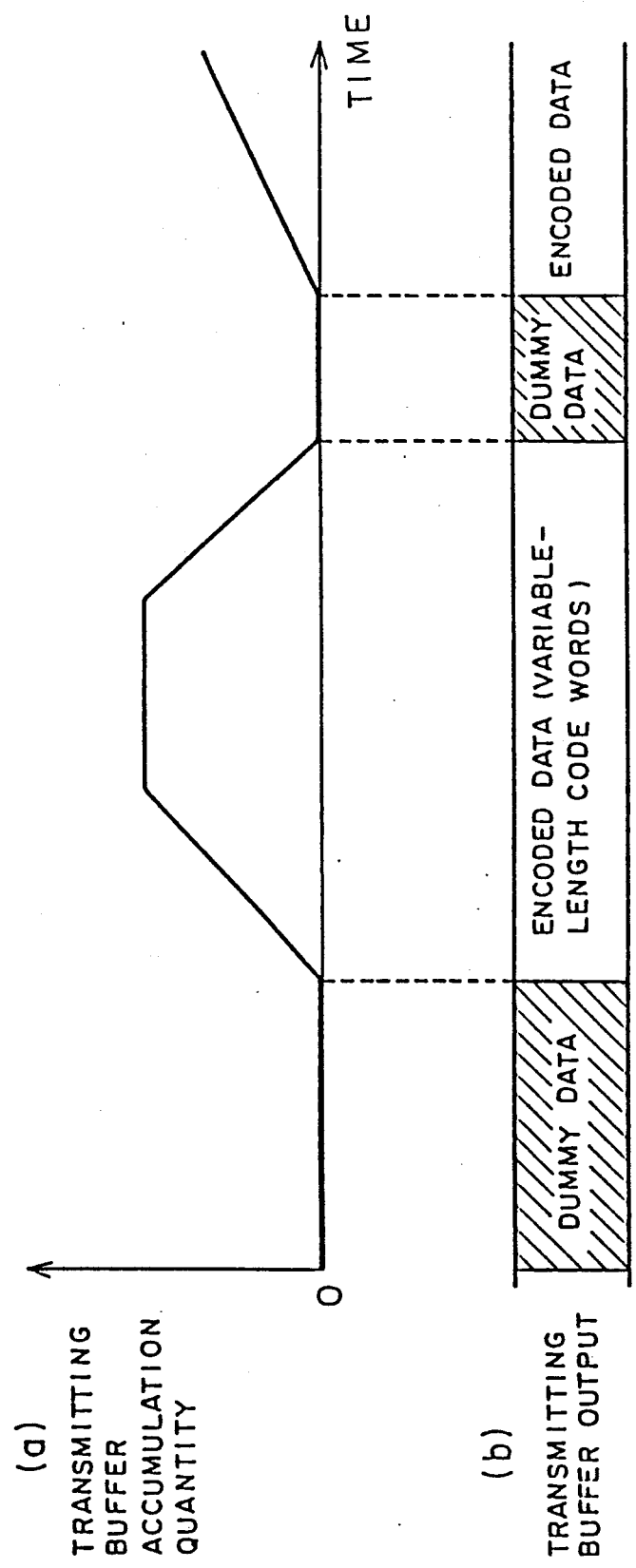
FIG. 2 is an explanatory drawing showing the operation of a transmitting buffer of the conventional picture signal encoding and decoding apparatus.
Figure 3:
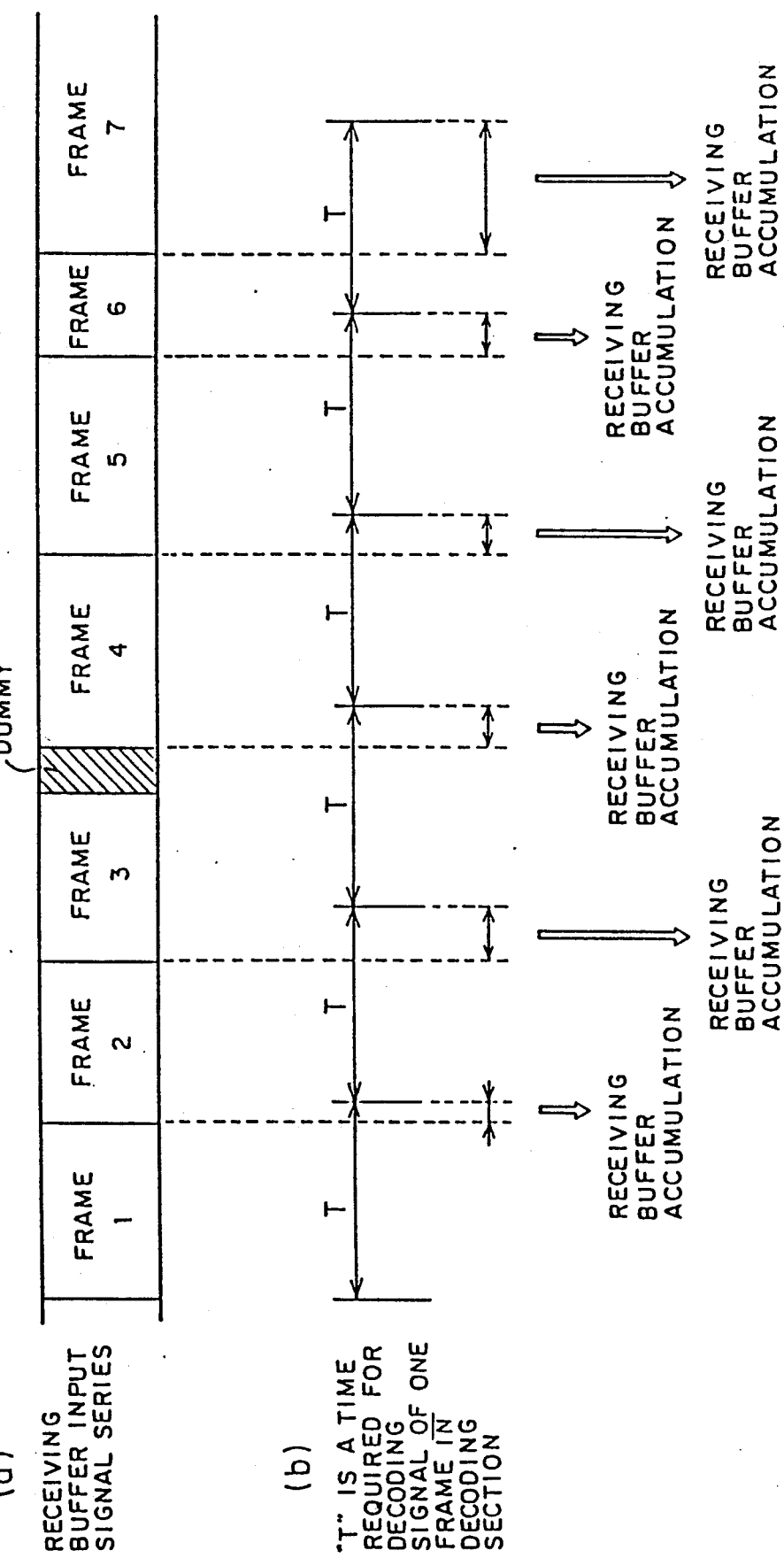
FIG. 3 is an explanatory drawing showing the operation of a receiving buffer of the conventional picture signal encoding and decoding apparatus.
Figure 4:
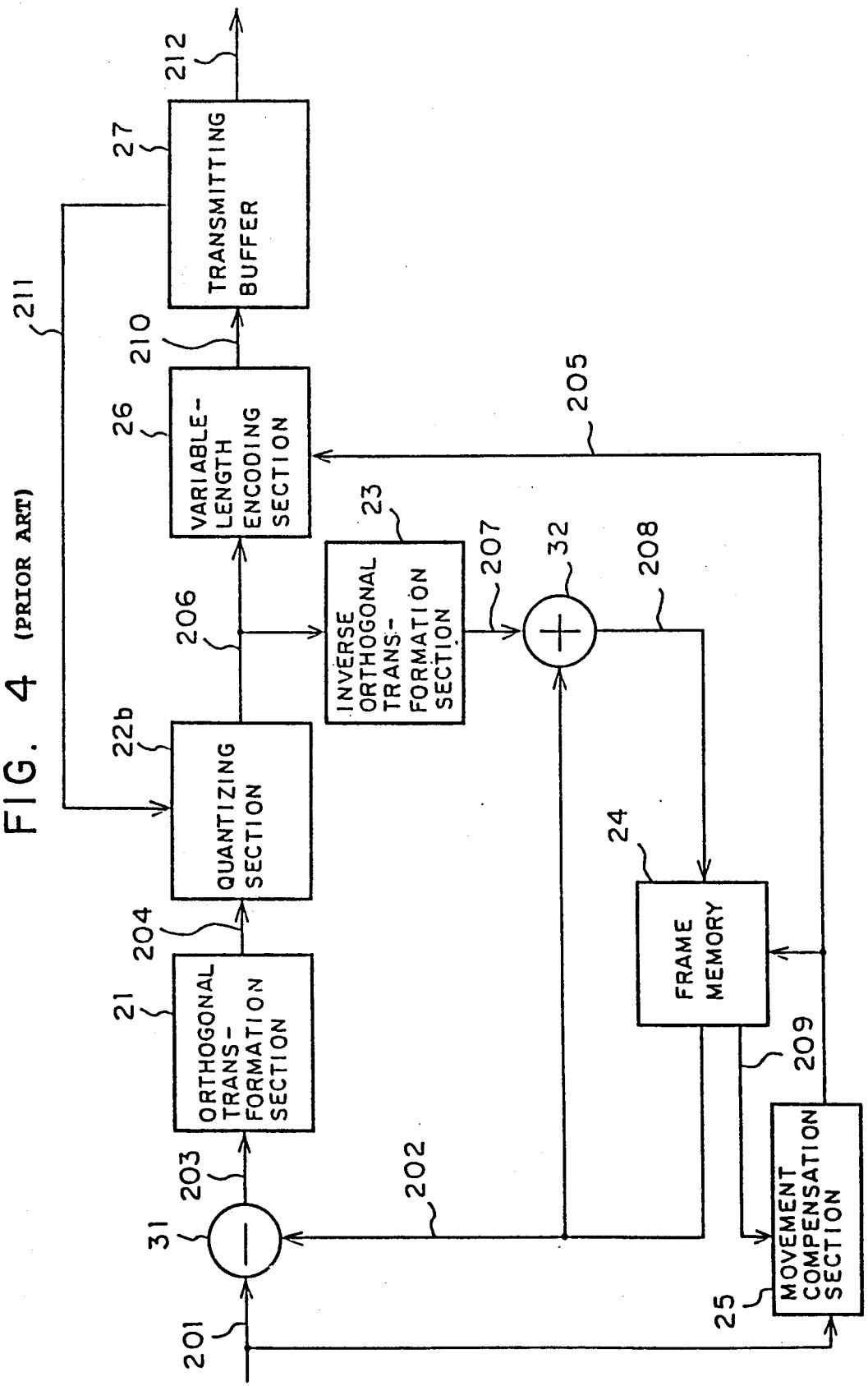
FIG. 4 is a block diagram showing the configuration of an encoding section by a transform coding method of the conventional picture signal encoding and decoding apparatus.

The preferred embodiments according to the present invention will be explained in detail referring to the drawings.

Figure 5:
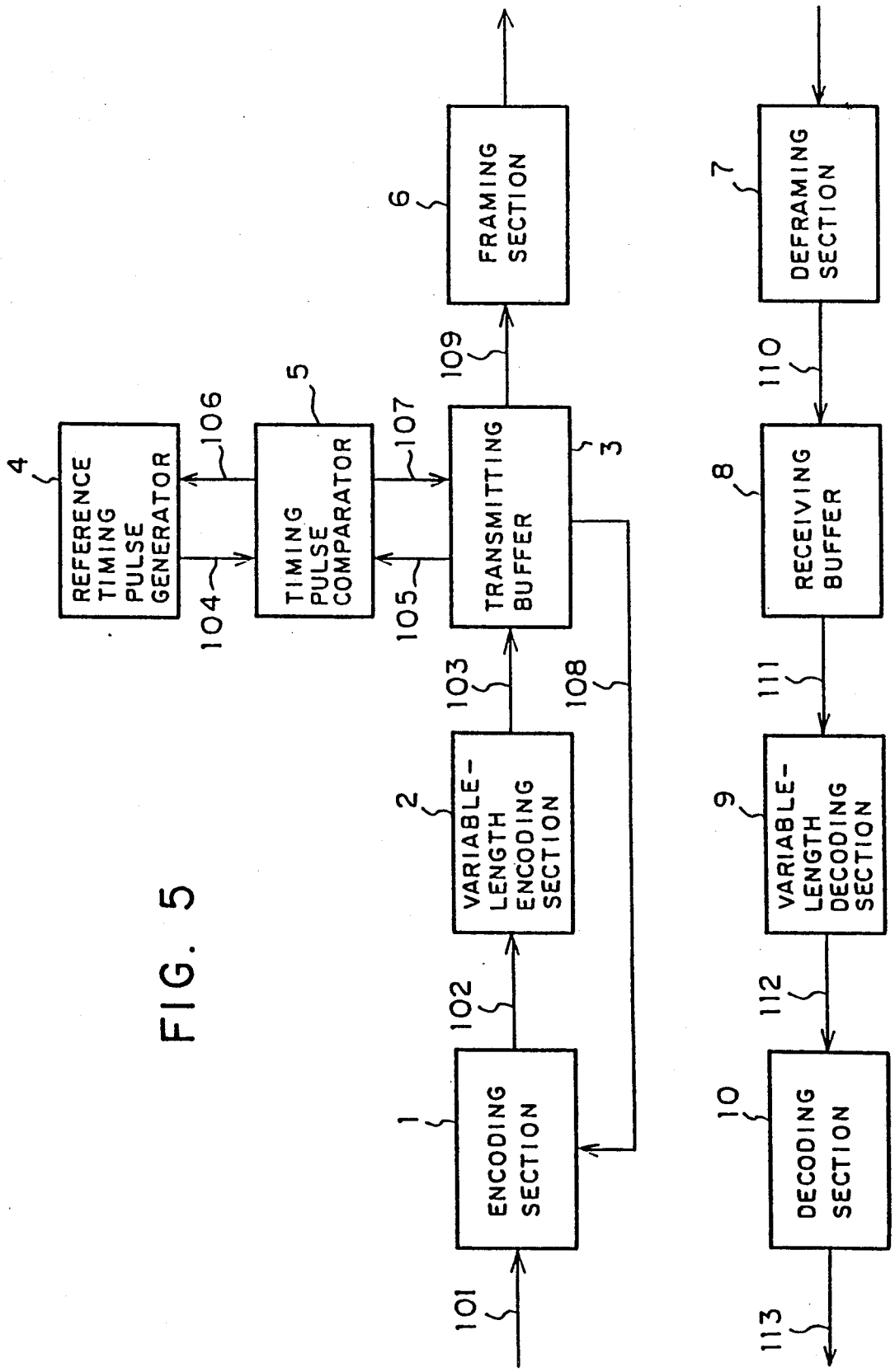
FIG. 5 is a block diagram showing the configuration of an encoding and decoding apparatus according to an embodiment of the present invention.
Figure 6:
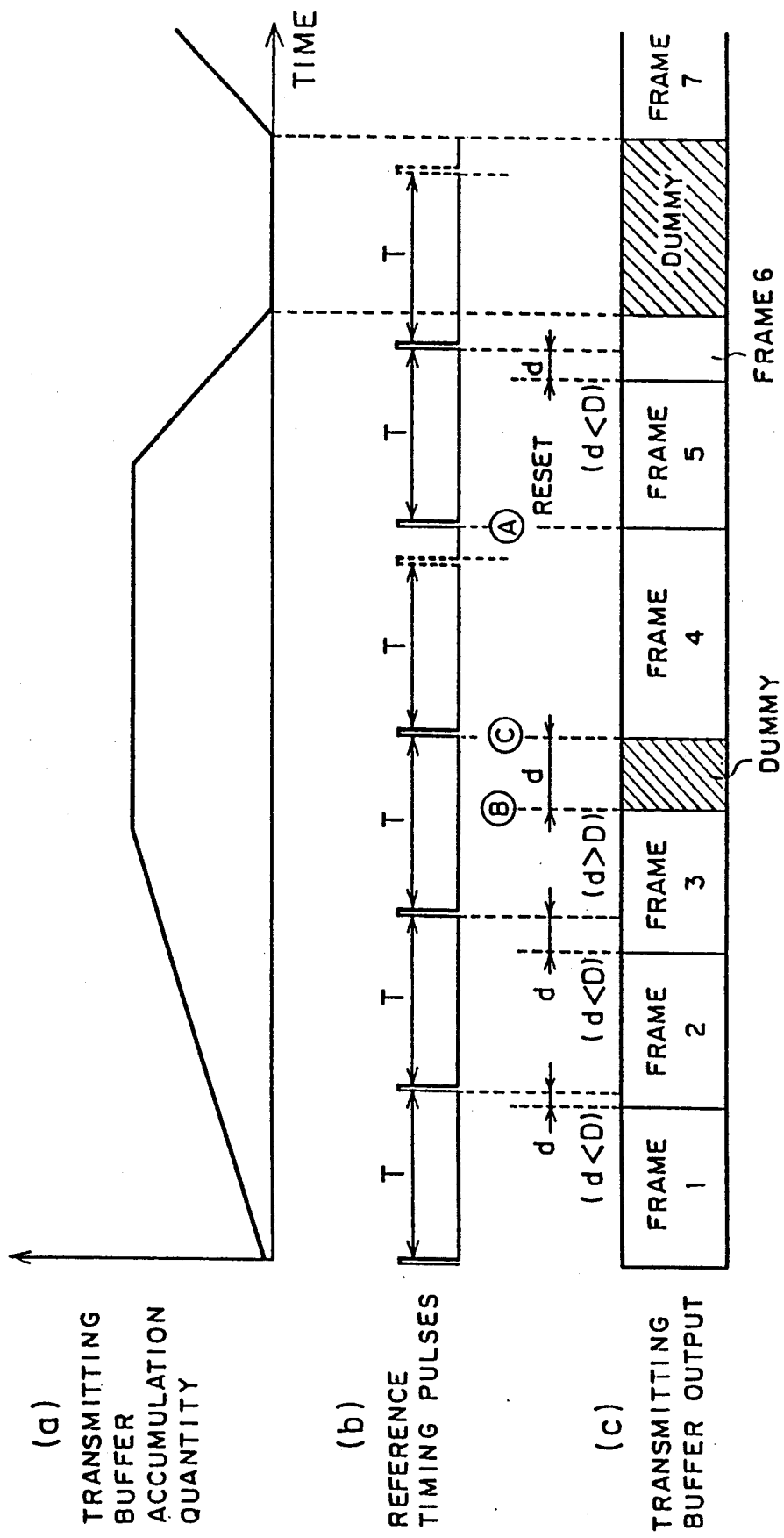
FIG. 6 is an explanatory drawing showing the operation of a transmitting buffer according to the embodiment of the present invention.
Figure 7:
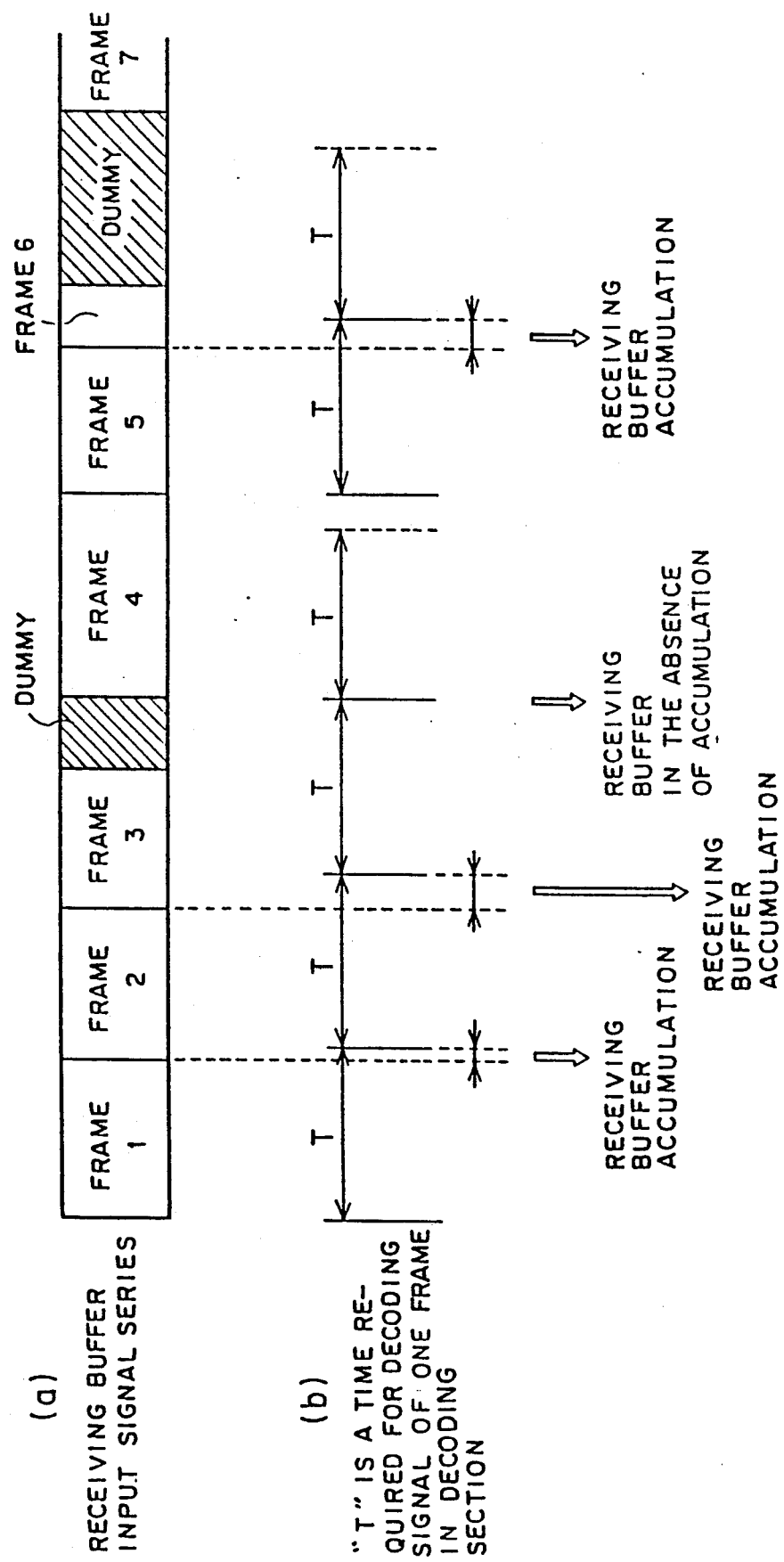
FIG. 7 is an explanatory drawing showing the operation of a receiving buffer according to the embodiment of the present invention.

FIG. 5 is a block diagram showing the configuration of a picture signal encoding and decoding apparatus according to an embodiment of the present invention. In the figure, 4 is a reference timing pulse generator which can generate a pulse signal of a fixed period; 5 is a timing pulse comparator which compares the output of the reference timing pulse generator 4 with the timing pulse monitored by the transmitting buffer 3; 104 is a reference pulse train output from the reference timing pulse generator 4; 105 is a timing pulse train monitored by the transmitting buffer 3; 106 is a reset signal which resets the phase of the pulses output from the reference timing pulse generator 4; 107 is a control signal which controls the operation of the transmitting buffer 3 based on the comparison result by the timing pulse comparing and adjusting section 5. The other component parts are similar or equivalent to those of a conventional apparatus; therefore the explanation of them is omitted. FIG. 6 is an explanatory drawing showing the operation of the transmitting buffer 3 according to an embodiment of the present invention. FIG. 7 is an explanatory drawing showing the operation of the receiving buffer 8 according to an embodiment of the present invention.

The operation is explained in the following. A digitized picture signal series 101 is converted to a coded-word series 102 in the encoding section 1; in this step each coded word has a fixed length. In the next step, variable-length encoding utilizing the deviation in the occurrence probability of each coded word is performed in the variable-length encoding section 2. In other words, the coded-word series 102 is converted to the variable-length coded-word series 103. In comparison with the code quantity, the sum of the length of the coded-word series 102, the sum of the length of the variable-length coded words becomes smaller, which improves the transmission efficiency. As the code quantity becomes variable, to send out the data to a channel at a constant rate, the smoothing out of the data speed is performed by the transmitting buffer 3. The operation of the transmitting buffer 3 is explained referring to FIG. 6. The axis of abscissa of FIG. 6(a) expresses the time and the axis of ordinate expresses the buffer accumulation quantity. The basic operation of the buffer 3 is shown in the following. When more data are read from the buffer than those written to the buffer the accumulation quantity is decreased, and when more data are written to the buffer than those read from the buffer, the accumulation quantity is increased. The read speed from the buffer 3 is a constant rate (the number of codes per unit time) corresponding to the transmitting rate. When data are not read from the buffer 3 it outputs dummy pulses. There are two kinds of cases where reading is not performed. In a first case the buffer accumulation quantity is zero and there is no data to be read. Following is the explanation of a second case. In FIG. 6(b), T is a time interval in which a certain section of a picture signal (a continuous, fixed length picture signal series such as one picture frame or one line etc.) can be decoded on a receiving side, which will be explained later. In this case, the section mentioned in the above is assumed to be a frame for explanation. The pulses having the period T are created in the reference timing pulse generator 4 as a timing pulse train 104. On the other hand, the transmitting buffer 3 monitors a timing pulse 105 at the head of coded words corresponding to each frame. Refer to FIG. 6(c), the reference timing pulse 104 is compared with a timing pulse at a frame head 105 in the timing pulse comparing and adjusting section 5. When the timing of the reference timing pulse is earlier, at the later timing of the frame head timing pulse 105, a reset signal 106 is created to reset the reference pulse timing as shown by (A) in FIG. 6. When the timing of the frame head timing pulse 105 is earlier, the time difference "d" between the reference timing pulse 104 and the frame head timing pulse shall be found. The time difference "d" is obtained by subtracting the lapse of time from the reference timing pulse of the prior period from T. If the time difference "d" is larger than a predetermined threshold value "D", a control signal 107 is created to stop the reading from the transmitting buffer 3 as shown by (B) in FIG. 6. At the timing of delayed reference timing pulse 104, the control signal 107 is released to resume the reading from the transmitting buffer 3 as shown by ⓒ in FIG. 6. The description in the foregoing explains the second case where data are not read from the buffer 3. The object of above-mentioned control is to secure a necessary time interval for decoding on the receiving side, which will be explained later. The output 109 from the transmitting buffer 3 (to be described later in detail) has a constant rate including dummy pulses. A framing section 6 performs framing at fixed intervals for the transmitting buffer output 109, and sends them out to a transmission line. On the receiving side, deframing is performed in a deframing section 7 for an input signal series and the data are once stored in the receiving buffer 8. The output of the receiving buffer is a variable-length code series 111, and the series 111 is converted to a fixed-length code series 112 in the variable-length signal decoding section 9. Further the fixed-length code series 112 is decoded to obtain a digital picture signal series 113 in the decoding section 10. In the course of receiving and decoding of a signal the decoding section 10 requires a certain time to decode the code words corresponding to a certain section of a picture signal. Following the former example, assuming that the certain section is a frame and a minimum time interval for decoding is T, the operation of the receiving buffer 8 is explained in the following. Assume that the input signal series 110 is given as shown in FIG. 7(a). The T is, as described in the above, the minimum time interval in which the decoding section 10 can decode the code words corresponding to a frame. When the timing of each frame head timing pulse precedes the timing of period T, the code words corresponding to the time difference are stored in the receiving buffer 8. Because of a slow decoding speed, if the accumulation quantity overflows the capacity of the receiving buffer 8, the decoding becomes impossible, but the upper limit of the accumulation quantity never exceeds "D" as described in the explanation of the transmitting buffer 3. "D" shall be decided corresponding to the capacity of the receiving buffer 8. If the two parameters "T" and "D" which represent the decoding capacity on the receiving side are known to the transmitting side there is no probability of the overflow of the receiving buffer 8.

In the above embodiment the section of a picture signal series is explained assuming that the section is a frame but the same effect can be obtained even when a line or other sequential section is used in place of a frame.

As shown in a preferred embodiment according to the present invention the apparatus is so constituted that the condition not to cause the overflow of the receiving buffer can be controlled on the transmitting side; it is not therefore an essential condition to have a large capacity receiving buffer or a high speed decoding circuit so that there are advantages that the apparatus can be constituted at a low cost and the stable operation is guaranteed.

Figure 8:
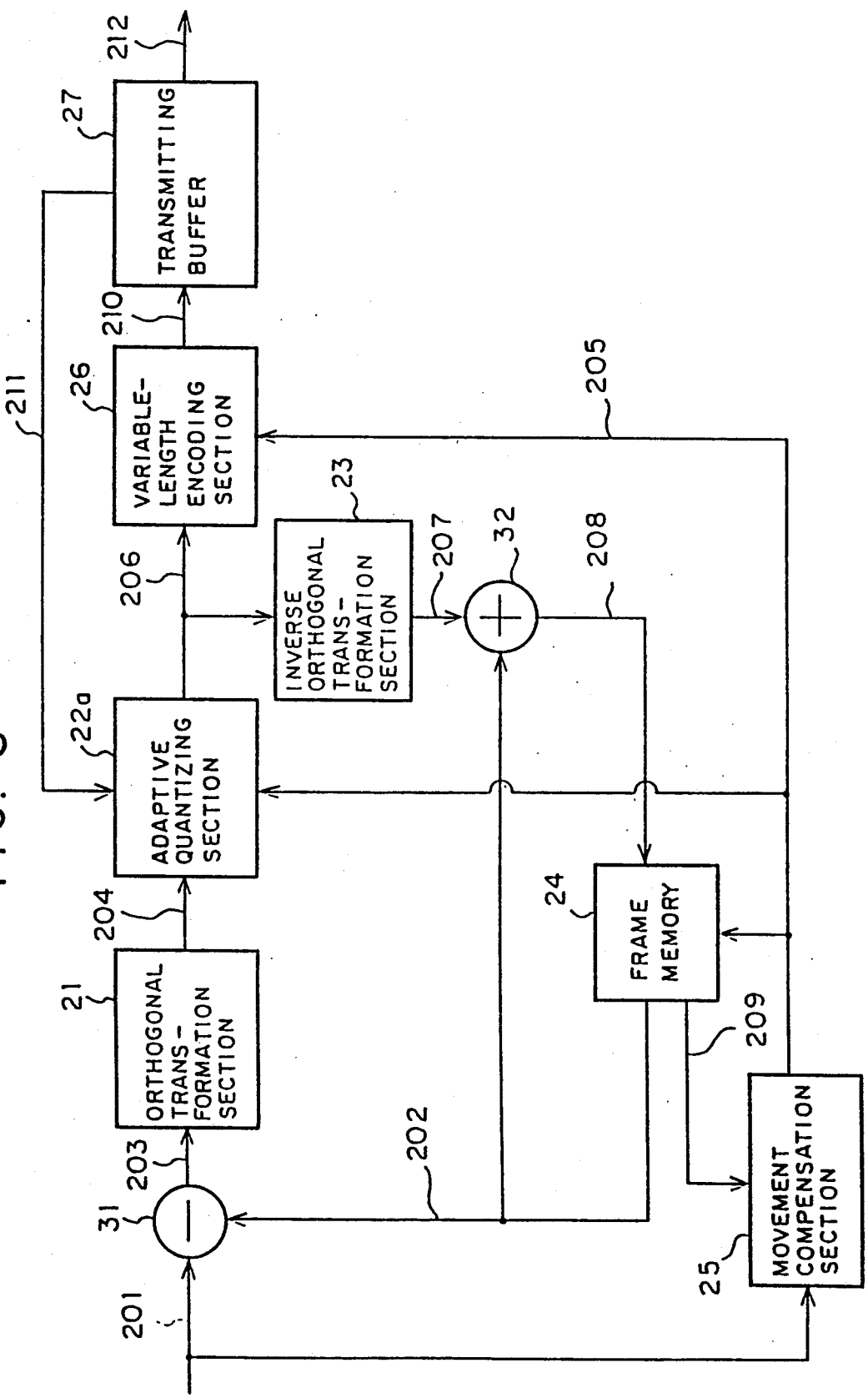
FIG. 8 is a block diagram showing the configuration of an encoding section of a picture signal coding and encoding apparatus according to another embodiment of the present invention.

FIG. 8 is a block diagram showing the configuration of a decoding section in a picture signal encoding and decoding apparatus in another embodiment of the present invention.

In the figure, 22a is an adaptive quantizing section which selects and uses a proper quantizer out of a plurality of them according to the spatial frequency which corresponds to a movement vector 205 of an input signal 201 and a sequence of a transformed coefficient. The other component parts are similar or equivalent to those of conventional apparatuses, so that the explanation of them is omitted.

The operation is explained in the following. The transformed coefficient 204 and the movement vector 205 obtained by similar processes to the conventional ones are input to the adaptive quantizing section 22a. In the adaptive quantizing section 22a as shown in FIG. 9, according to the sequence of the transformed coefficient 204 and to the size of the movement vector 205, a proper quantizing characteristic is selected and quantization is performed for the transformed coefficient 204 which is judged to be significant through a threshold process based on the buffer accumulation quantity 211. In the case of the selection of a quantizing characteristic, the movement vector 105 is transferred to the decoding side and the sequence of the transformed coefficient is also known to the decoding side, so that there is no need to send an overhead information. The other processes are similar to those of conventional apparatuses.

In the above-mentioned another embodiment, a case is shown in which quantizers are switched according to a spatial frequency component corresponding to the sequence of transformed coefficients 204 and the size of a movement vector 205, but in the case where the movement vector becomes zero, such a control as to interrupt the transformed coefficient whose corresponding spatial frequency is high is effective to decrease the temporal direction noise in a static region, for example, in a background.

In the above-mentioned another embodiment according to the present invention, a plurality of quantizers of different characteristics are prepared and a quantizing characteristic is selected based on the sequence of transformed coefficients and the size of a movement vector, so that the quantizing corresponding to the statistical characteristic of an input signal can be realized and also a signal can be efficiently compressed.

Still another embodiment of the present invention is shown in FIG. 10, in which 28 is an inverse quantization section which selects and uses a proper quantizer out of a plurality of them according to the spatial frequency which corresponds to a movement vector 205 of an input signal 201 and a sequence of a transformed coefficient. The other component parts are similar or equivalent to those of conventional apparatuses, so that the explanation of them is omitted.

The operation is explained in the following. The transformed coefficient 204 and the movement vector 205 obtained by similar processes to the conventional ones are input to the inverse quantizing section 28. In the inverse quantizing section 28 as shown in FIG. 9, according to the sequence of the transformed coefficient 204 and to the size of the movement vector 205, a proper quantizing characteristic is selected and inversed quantization is performed for the transformed coefficient 204 which is judged to be significant through a threshold process based on the buffer accumulation quantity 211. The other processes are similar to those of conventional apparatuses.

What is claimed is:

1. A picture signal encoding and decoding apparatus comprising an encoding section for conversion encoding with movement compensation and a decoding section, said encoding section having: a movement detecting section for detecting the movement quantity of a digital picture signal; a subtracter for obtaining the difference between said digital picture signal and a predictive signal; an orthogonal transformation section which performs orthogonal transformation to a differential signal obtained from said subtracter; a quantizing section for quantizing a transform coefficient; and means for selecting a predetermined quantization characteristic from a plurality of such characteristics as a function of both the movement quantity detected by said movement detecting section and the sequence of transform coefficients for performing adaptively selected quantization of the transform coefficients, said decoding section having: an inverse orthogonal transformation section for creating a decoded differential signal by inverse orthogonal transformation; an adder for creating a decoded picture signal by adding said decoded differential signal to said predictive signal for movement compensation; and a memory for storing said decoded picture signal and creating said predictive signal for movement compensation according to said movement quantity.

2. A picture signal encoding and decoding apparatus according to claim 1, wherein the sequence of transform coefficients, is classified according to selected frequency divisions.

3. A picture encoding and decoding apparatus according to claim 2, wherein the quantization characteristics are determined for each of the selected frequency divisions of transform coefficients.

4. A picture signal encoding and decoding apparatus according to claim 1, 2 or 3, wherein said decoding section further includes an inverse quantization section separate from said inverse orthogonal transformation section.

* * * * *